US012261364B2

(12) United States Patent
Chen et al.

(10) Patent No.: US 12,261,364 B2
(45) Date of Patent: Mar. 25, 2025

(54) ANTENNA MODULE, METAMATERIAL STRUCTURE AND ELECTRONIC DEVICE

(71) Applicant: WISTRON NEWEB CORPORATION, Hsinchu (TW)

(72) Inventors: Wei-Jin Chen, Hsinchu (TW); Tsun-Che Huang, Hsinchu (TW); Jia-Hung Su, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 280 days.

(21) Appl. No.: 18/179,430

(22) Filed: Mar. 7, 2023

(65) Prior Publication Data

US 2024/0047889 A1 Feb. 8, 2024

(30) Foreign Application Priority Data

Aug. 8, 2022 (TW) ................................. 111129678

(51) Int. Cl.
*H01Q 15/00* (2006.01)
*H01Q 9/04* (2006.01)

(52) U.S. Cl.
CPC ....... *H01Q 15/0086* (2013.01); *H01Q 9/0464* (2013.01)

(58) Field of Classification Search
CPC ..... H01Q 15/0086; H01Q 9/0464; H01Q 1/42
See application file for complete search history.

(56) References Cited

FOREIGN PATENT DOCUMENTS

| | | |
|---|---|---|
| CN | 114498057 A | 5/2022 |
| TW | 201320467 A1 | 5/2013 |

*Primary Examiner* — Dimary S Lopez Cruz
*Assistant Examiner* — Aladdin Abdulbaki
(74) *Attorney, Agent, or Firm* — McClure, Qualey & Rodack, LLP

(57) ABSTRACT

An antenna module, a metamaterial structure and an electronic device are provided. The electronic device includes a housing, a glass material layer and an antenna module. The antenna module includes a substrate, at least one radiating element and a metamaterial structure. The metamaterial structure includes a metamaterial substrate, a plurality of first metal conductors, and a plurality of second metal conductors. The first metal conductors are disposed on the first surface of the metamaterial substrate and are spaced apart at intervals from each other, and the second metal conductors are disposed on the second surface of the metamaterial substrate and are spaced apart at intervals from each other. The first metal conductors respectively correspond to the second metal conductors. Shapes of the first metal conductors are different from shapes of the second metal conductors.

18 Claims, 10 Drawing Sheets

ANTENNA MODULE, METAMATERIAL STRUCTURE AND ELECTRONIC DEVICE

CROSS-REFERENCE TO RELATED PATENT APPLICATION

This application claims the benefit of priority to Taiwan Patent Application No. 111129678, filed on Aug. 8, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna module, a metamaterial, and an electronic device, and more particularly to an antenna module, a metamaterial, and an electronic device capable of improving the ability to penetrate the medium.

BACKGROUND OF THE DISCLOSURE

With the development of fifth-generation mobile communication, applications of millimeter-waves (mmWave) are continually developed and innovated, such as that of a mmWave radar with gesture recognition function. However, due to the high frequency of the mmWave, the penetration ability of the mmWave is easily limited by the surrounding environment. For example, when the mmWave passes through a medium such as glass, reflection and refraction will occur, which severely affects the antenna pattern and phase, thereby affecting the accuracy of gesture recognition.

Therefore, how to improve the ability of the mmWave to penetrate the medium by improving the design of the antenna structure, so as to overcome the above-mentioned problems, has become one of the important issues to be solved in the related field.

SUMMARY OF THE DISCLOSURE

In response to the above-referenced technical inadequacy the present disclosure provides an antenna module, a metamaterial, and an electronic device, which can address an issue of the ability of the mmWave to penetrate the medium being easily limited.

In one aspect, the present disclosure provides an antenna module, which includes a substrate, at least one radiating element, and a metamaterial structure. The at least one radiating element and the metamaterial structure are disposed on the substrate and located on a same side of the substrate. The metamaterial structure includes a metamaterial substrate, a plurality of first metal conductors, and a plurality of second metal conductors. The metamaterial substrate has a first surface and a second surface disposed opposite to each other, and the second surface faces the at least one radiating element. The first metal conductors are disposed on the first surface and spaced apart at intervals from each other. The second metal conductors are disposed on the second surface and spaced apart at intervals from each other. The first metal conductors respectively correspond to the second metal conductors, and shapes of the first metal conductors are different from shapes of the second metal conductors.

In another aspect, the present disclosure provides a metamaterial structure suitable for an antenna module, and the antenna module is used for providing an operating frequency. The metamaterial structure includes a metamaterial substrate, a plurality of first metal conductors, and a plurality of second metal conductors. The metamaterial substrate has a first surface and a second surface disposed opposite to each other. The first metal conductors are disposed on the first surface and spaced apart at intervals from each other. The second metal conductors are disposed on the second surface and spaced apart at intervals from each other. The first metal conductors respectively correspond to the second metal conductors, and shapes of the first metal conductors are different from shapes of the second metal conductors.

In yet another aspect, the present disclosure provides an electronic device, which includes a housing, a glass material layer, and an antenna module. The glass material layer is disposed at the housing. The antenna module is disposed in the housing. The antenna module includes a substrate, at least one radiating element, and a metamaterial structure. The at least one radiating element and the metamaterial structure are disposed on the substrate and located on a same side of the substrate. The metamaterial structure includes a metamaterial substrate, a plurality of first metal conductors, and a plurality of second metal conductors. The metamaterial substrate has a first surface and a second surface disposed opposite to each other. The second surface faces the at least one radiating element. The first metal conductors are disposed on the first surface and spaced apart at intervals from each other, and the first metal conductors contact the glass material layer. The second metal conductors are disposed on the second surface and spaced apart at intervals from each other. The first metal conductors respectively correspond to the second metal conductors, and shapes of the first metal conductors are different from shapes of the second metal conductors.

Therefore, in the antenna module, the metamaterial, and the electronic device provided by the present disclosure, the metamaterial structure has a metamaterial substrate, a plurality of first metal conductors, and a plurality of second metal conductors respectively disposed on the first surface and the second surface, which can improve the ability of the mmWave to penetrate the medium, thereby reducing the effect of the medium on the radiation characteristics and radiation patterns of the antenna module.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
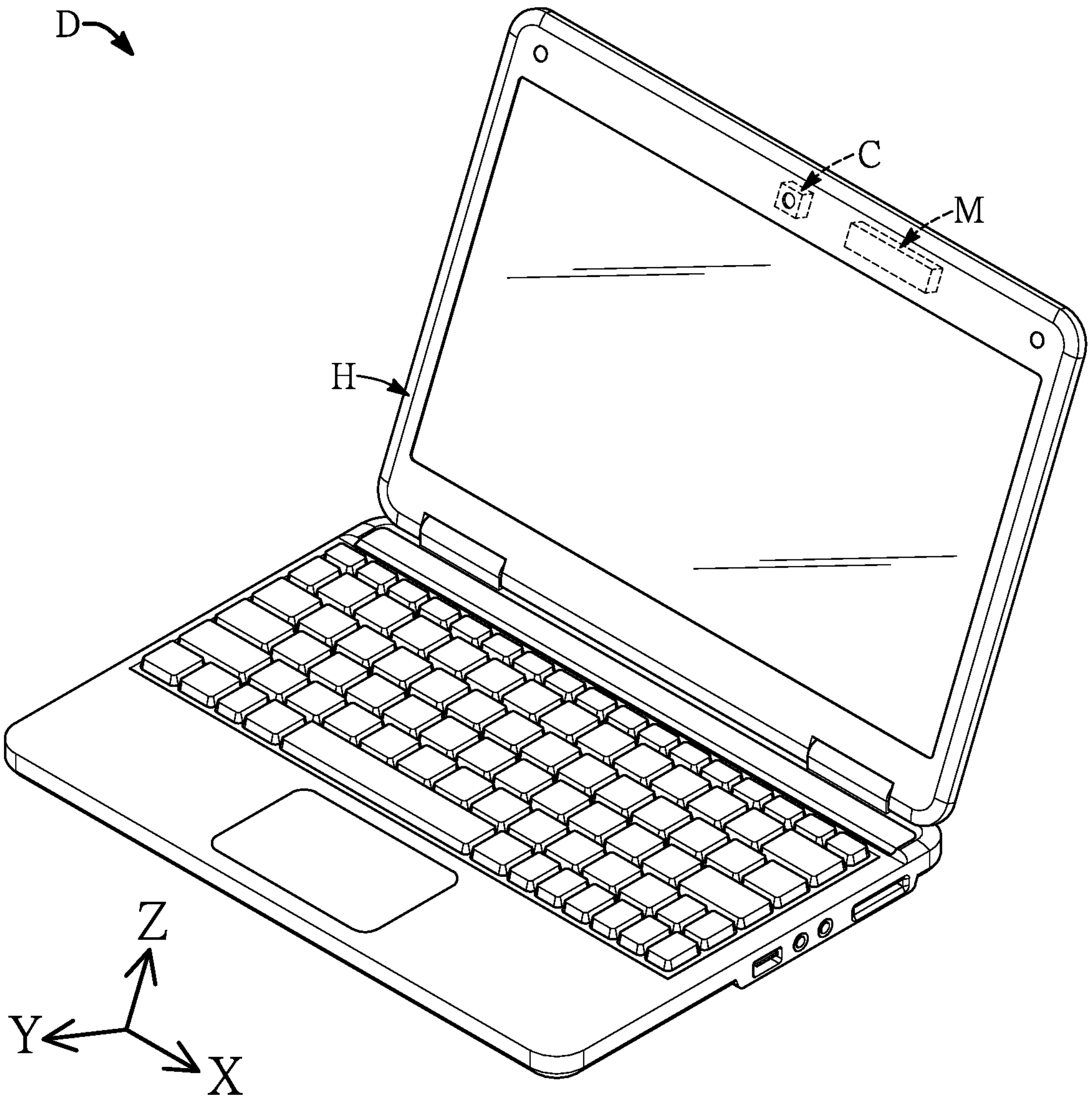
FIG. 1 is a schematic perspective view of an electronic device according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In addition, the term "connect" or "connected" in the context of the present disclosure means that there is a physical connection between two elements, and the two elements are directly or indirectly connected. The term "couple" or "coupled" in the context of the present disclosure means that two elements are separate from each other and have no physical connection therebetween, and an electric field energy generated by one of the two elements excites an electric field energy generated by another one of the two elements.

Embodiments

Figure 2:
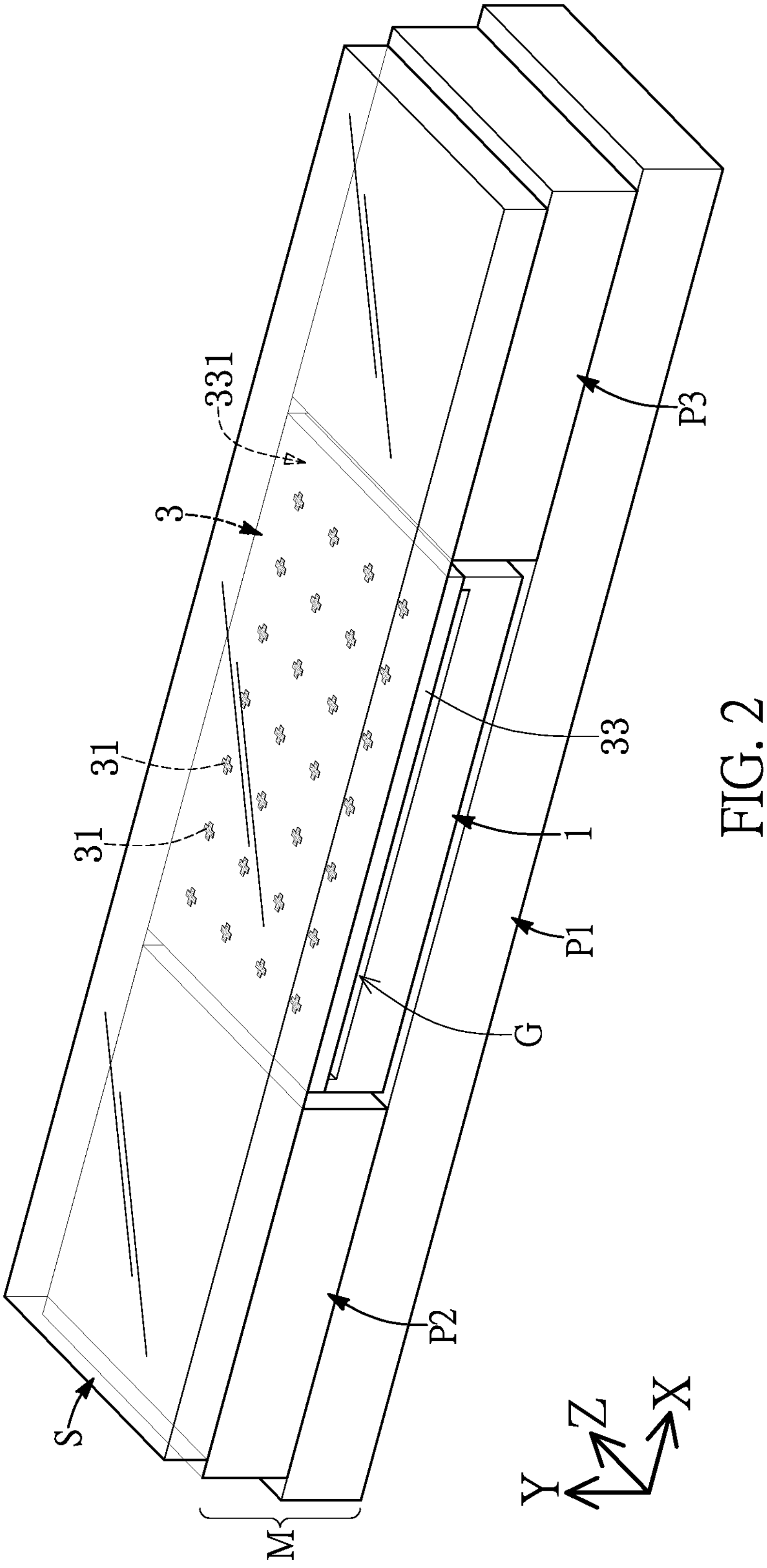
FIG. 2 is a schematic perspective view of an antenna module with a glass material layer according to the present disclosure.

Referring to FIG. 1 and FIG. 2. FIG. 1 is a schematic perspective view of an electronic device according to the present disclosure. FIG. 2 is a schematic perspective view of an antenna module with a glass material layer according to the present disclosure. The present disclosure provides an electronic device D, which includes a housing H, a glass material layer S, a substrate 1, and an antenna module M. The glass material layer S is disposed at the housing H, and the antenna module M is disposed in the housing H. For example, the antenna module M is suitable for millimeter waves (mmWave), but the present disclosure is not limited thereto. The electronic device can be a notebook computer, and the antenna module M can be disposed close to lens C of display end of the notebook computer. However, the present disclosure is not limited to the type of the electronic device D and the position of the antenna module M. As shown in FIG. 2, the glass material layer S is stacked above the antenna module M along a negative Y-axis direction. In the present disclosure, the glass material layer S is a glass sheet disposed on the display end of the electronic device D. An electromagnetic wave (i.e., mmWave) emitted by the antenna module M penetrates the glass material layer S, and is emitted to the external environment afterwards. Another electromagnetic wave (i.e., mmWave) emitted into the antenna module M from the external environment also penetrates the glass material layer S and is then received by the antenna module M.

Figure 3:
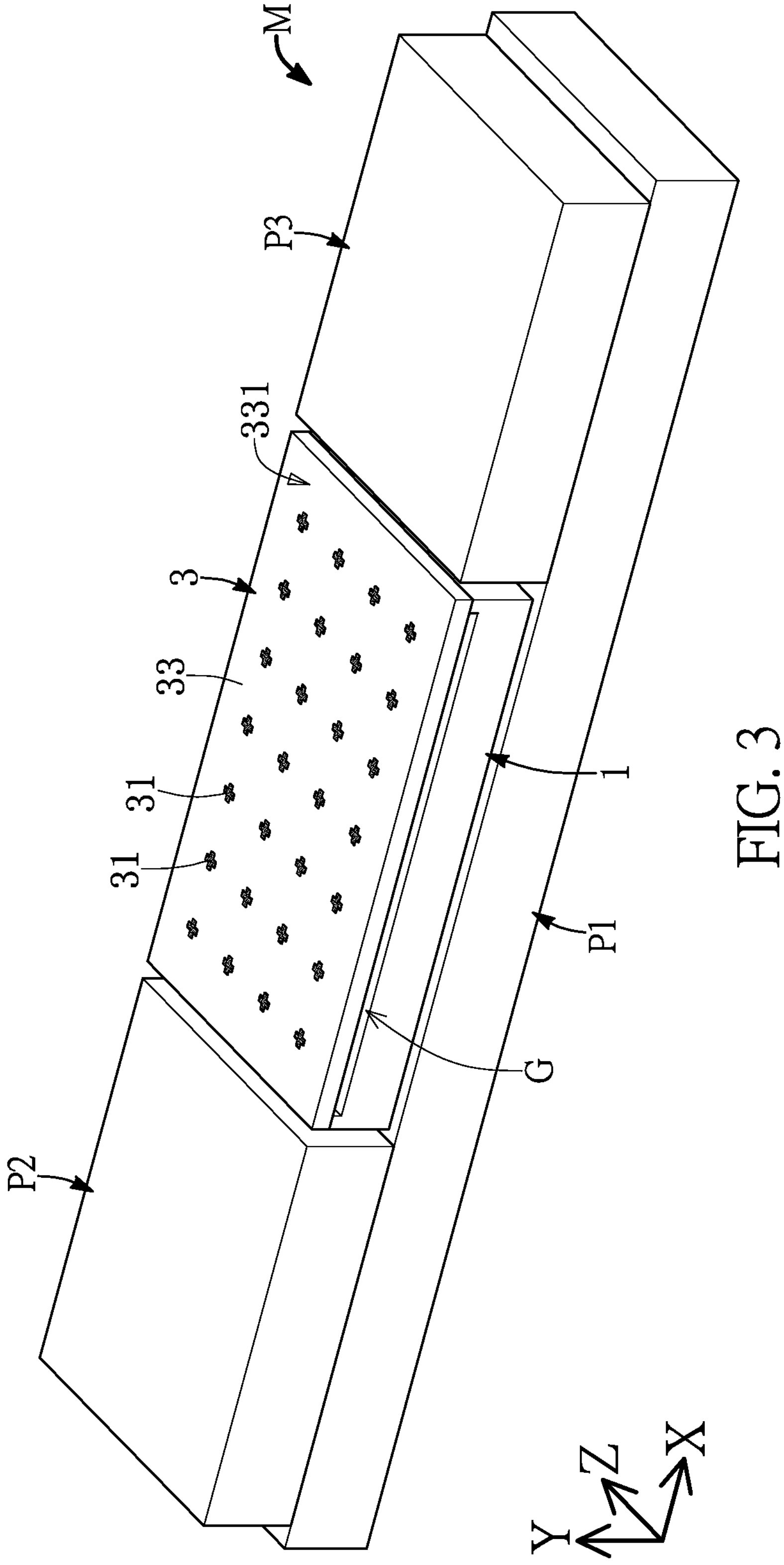
FIG. 3 is a schematic perspective view of the antenna module according to the present disclosure.
Figure 4:
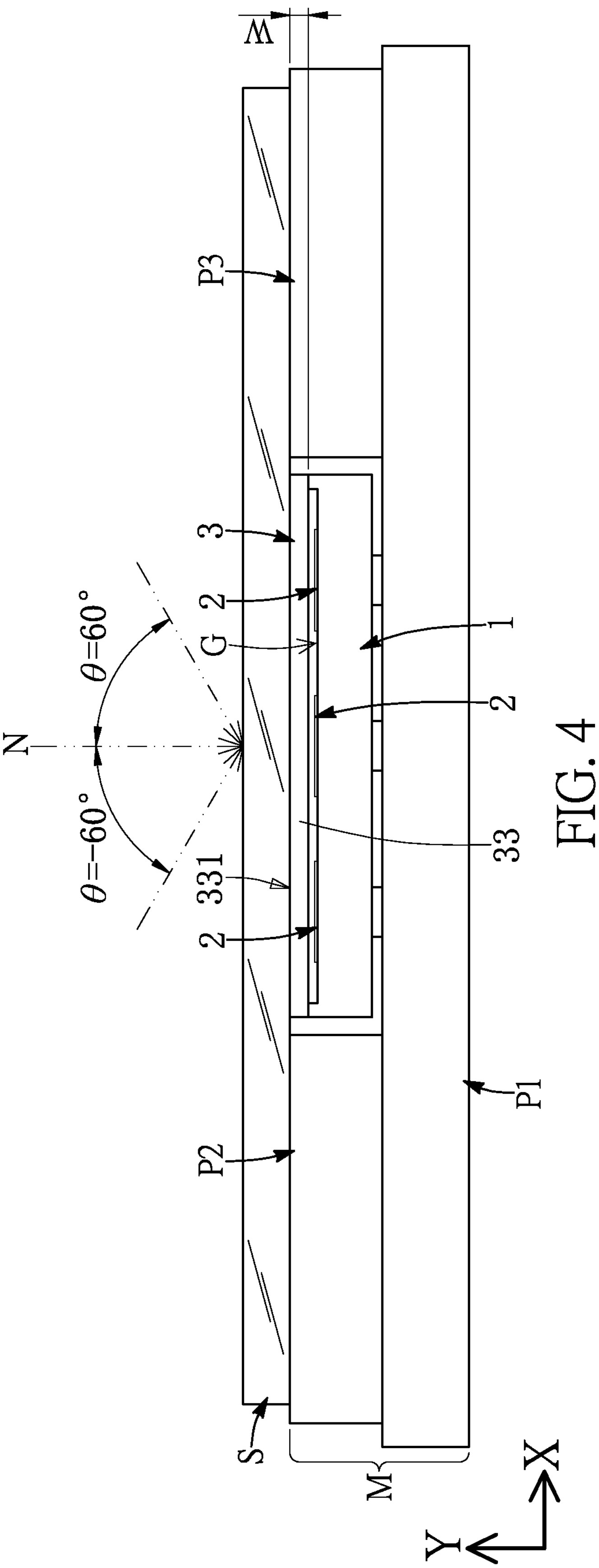
FIG. 4 is a schematic side view of the antenna module with the glass material layer according to the present disclosure.
Figure 5:
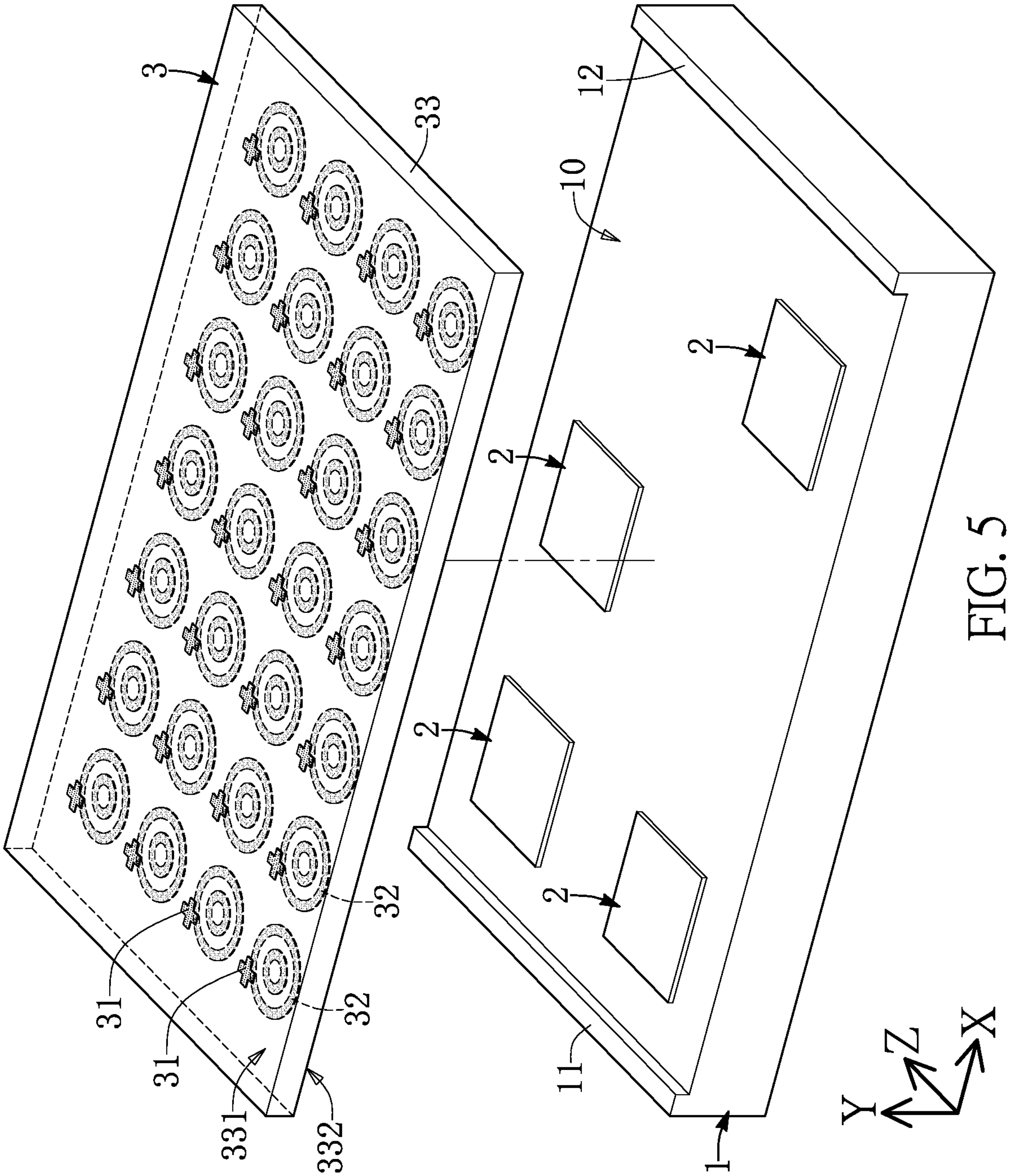
FIG. 5 is a schematic exploded view of the antenna module according to the present disclosure.

Referring to FIG. 3 to FIG. 5. FIG. 3 is a schematic perspective view of the antenna module according to the present disclosure. FIG. 4 is a schematic side view of the antenna module with the glass material layer according to the present disclosure. FIG. 5 is a schematic exploded view of the antenna module according to the present disclosure. The antenna module M includes a substrate 1, at least one radiating element 2, and a metamaterial structure 3. The at least one radiating element 2 and the metamaterial structure 3 are disposed on the substrate 1 and located on a same side of the substrate 1. The substrate 1 can be a flame retardant 4 (FR4) substrate, a printed circuit board (PCB), or a flexible printed circuit board (FPCB), but the present disclosure is not limited thereto. The at least one radiating element 2 can be a patch antenna, and a quantity of at least one radiating element 2 can be one or more, but the present disclosure is not limited thereto. As shown in FIG. 5, in the present disclosure, the antenna module M includes four radiating elements 2, and the four radiating elements 2 are arranged to form an antenna array. One of the radiating elements 2 serve as a transmitter (Tx), and the other three radiating elements 2 serve as receivers (Rx).

In addition, the antenna module M further includes a first absorber P1, a second absorber P2, and a third absorber P3. The second absorber P2 and the third absorber P3 are disposed on the first absorber P1. The substrate 1, the four radiating elements 2, and the metamaterial structure 3 are disposed between the second absorber P2 and the third absorber P3. The absorbers (the first absorber P1, the second absorber P2, and the third absorber P3) are used to absorb the electromagnetic wave emitted by the radiating element 2 as the transmitter, such that the electromagnetic wave is concentrated and emitted toward the glass material layer S. For example, the absorbers are made of rubber or electromagnetic wave-suppressing material, but the present disclosure is not limited to the material, shapes, quantities, and forms of the absorbers.

As shown in FIG. 5, the metamaterial structure 3 includes a plurality of first metal conductors 31, a plurality of second metal conductors 32, and a metamaterial substrate 33. The material of the metamaterial substrate 33 can be the same as that of the substrate 1, but the present disclosure is not limited thereto. The metamaterial substrate 33 has a first surface 331 and a second surface 332 disposed opposite to each other. The first metal conductors 31 are disposed on the first surface 331 and spaced apart at intervals from each other. The second metal conductors 32 are disposed on the second surface 332 and spaced apart at intervals from each other. The first metal conductors 31 respectively correspond to the second metal conductors 32. A projection point from a geometric center of each of the first metal conductors 31 being orthogonally projected onto the second surface 332 overlaps with a projection point from a geometric center of a corresponding one of the second metal conductors 32 being orthogonally projected onto the second surface 332. Furthermore, each of the first metal conductors 31 and the corresponding one of the second metal conductors 32 are not in contact with each other, and capacitive characteristic are generated between each of the first metal conductors 31 and the corresponding one of the second metal conductors 32.

According to the above description, the metamaterial substrate 33 are disposed on the substrate 1, and the first surface 331 is attached to the glass material layer S. Therefore, the first metal conductors 31 directly contact the glass material layer S. The second surface 332 of the metamaterial substrate 33 faces the antenna array. The antenna array and the second surface 332 of the metamaterial substrate 33 are not in contact with each other. The antenna array and the second surface 332 of the metamaterial substrate 33 are spaced apart from each other by an air gap G. That is to say, the second metal conductors 32 are in direct contact with the air. It is worth mentioning that, in another embodiment, the antenna array can also directly contact the second surface 332 of the metamaterial substrate 33, i.e, there can be no air gap G between the antenna array and the second surface 332 of the metamaterial substrate 33.

It should be noted that ways of forming the air gap G are not limited in the present disclosure. For example, as shown in FIG. 5, two independent gaskets can be used as a first wall 11 and a second wall 12 respectively to be disposed on the surface 10 of the substrate 1. Alternatively, an initial surface of the substrate 1 can have a groove formed thereon. The bottom surface of the groove is the surface 10 of the substrate 1, and the two side walls of the groove are the first wall 11 and the second wall 12 respectively. There is a height difference between the first wall 11 and the second wall 12 and the surface 10 of the substrate 1. Therefore, when the metamaterial substrate 33 is disposed on the substrate 1, the air gap G is formed between the antenna array and the second surface 332 of the metamaterial substrate 33 because of the height difference.

The first surface and the second surface are spaced apart from each other by a predetermined thickness W, and a width of the air gap G is less than twice the predetermined thickness W. In this embodiment, the width of the air gap G is 0.12 mm Accordingly, the present disclosure can perform the impedance matching on the glass material layer S through the structural design of the metamaterial structure 3 and the air gap G, such as to counteract the effect of the glass material layer S on the radiation characteristic and the radiation patterns of the antenna module M. Further, the higher the distribution density of the first metal conductors 31 on the first surface 331 of the metamaterial substrate 33, and the higher the distribution density of the second metal conductors 32 on the second surface 332 of the metamaterial substrate 33, the stronger the penetration ability of the electromagnetic wave will be.

The principles for designing the antenna module M and the metamaterial structure 3 thereof are further described. As shown in FIG. 4 and FIG. 5, the electromagnetic wave penetrates different mediums such as the glass material layer S, the first metal conductors 31, the metamaterial substrate 33, the second metal conductors 32, and the air gap G from the external environment along the negative Y-axis direction, and is then received by one of the radiating elements 2 as the receiver in the antenna array. An equivalent circuit model can be established according to a transmission path of the electromagnetic wave. The external environment and the air gap G are equivalent to the two ports in the equivalent circuit. The glass material layer S and the metamaterial substrate 33 are equivalent to equivalent transmission lines in the equivalent circuit. Each of the two ports and the equivalent transmission lines has an equivalent impedance.

However, the aforementioned details are disclosed for exemplary purposes only, and are not meant to limit the scope of the present disclosure. The first metal conductors 31 and the second metal conductors 32 are respectively equivalent to two parallel equivalent capacitors in the equivalent circuit. Accordingly, the present disclosure can adjust the capacitances of the two parallel equivalent capacitors through the simulation of the equivalent circuit to perform impedance matching.

Figure 8:
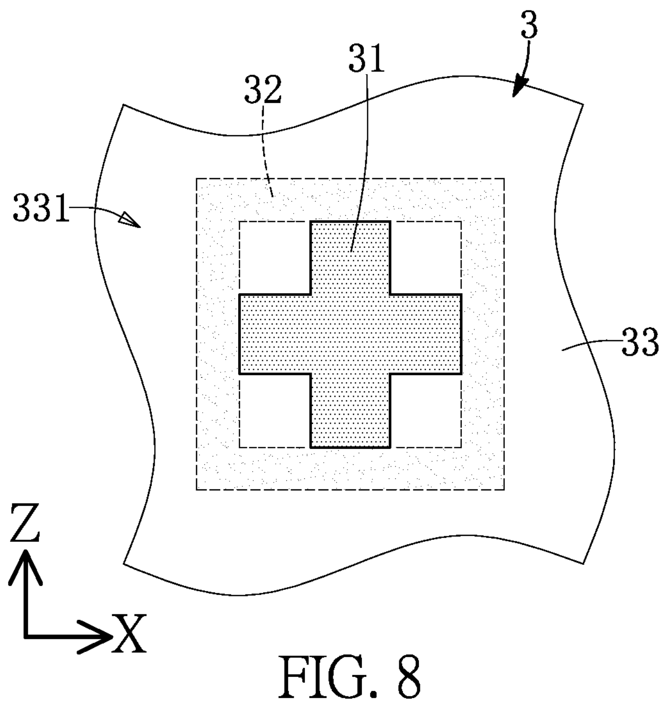
FIG. 8 is a schematic view of a first metal conductor and a second metal conductor of the metamaterial structure in another embodiment according to the present disclosure.

Moreover, shapes of the first metal conductors 31 are different from shapes of the second metal conductors 32. In this embodiment, each of the first metal conductors 31 is formed to have a cross-shaped structure, and each of the second metal conductors 32 is formed to have two ring structures are concentric and not in contact with each other. In addition, referring to FIG. 8. FIG. 8 is a schematic view of a first metal conductor and a second metal conductor of the metamaterial structure in another embodiment according to the present disclosure. In another embodiment, each of the first metal conductors 31 is formed to have a cross structure, and each of the second metal conductors 32 is formed to have a square structure. The shapes of the first metal conductors 31 and the second metal conductors 32 are not limited in the present disclosure. Since the first metal conductors 31 directly contact the glass material layer S, and the second metal conductors 32 face the air gap G (i.e., are in direct contact with the air), the two equivalent capacitors in the equivalent circuit are essentially connected in series with two equivalent impedances, respectively. Accordingly, the present disclosure can adjust the shapes of the first metal conductors 31 and the second metal conductors 32 through the simulation of the equivalent circuit to improve the impedance matching.

Moreover, in the present disclosure, an area of each of the first metal conductors 31 is less than an area of the corresponding one of the second metal conductors 32, and the area of the metal conductors (the first metal conductors 31 and the second metal conductors 32) is proportional to the equivalent capacitance. Therefore, the equivalent capacitance of the first metal conductor 31 is smaller than the equivalent capacitance of the corresponding second metal conductor 32 through the area of each of the first metal conductors 31 being less than the area of the corresponding one of the second metal conductors 32, such that the matching effect is improved.

Figure 6:
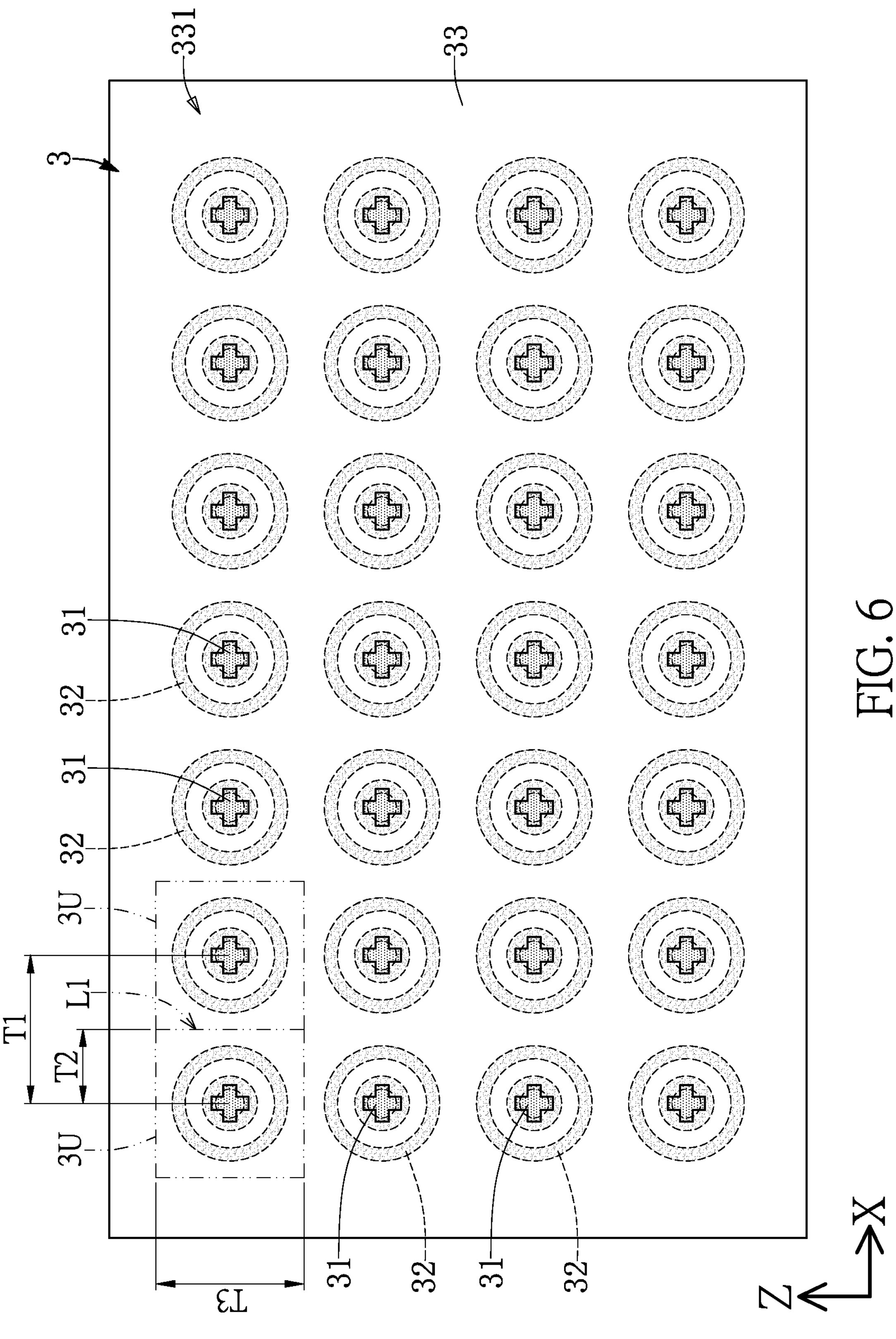
FIG. 6 is a schematic top view of a metamaterial structure according to the first embodiment of the present disclosure.

Referring to FIG. 6, FIG. 6 is a schematic top view of a metamaterial structure according to the first embodiment of the present disclosure. The metamaterial structure 3 includes a plurality of unit cells 3U. Each of the unit cells 3U includes one of the first metal conductors 31 and a corresponding one of the second metal conductors 32. A boundary L1 of each of the unit cells 3U and the geometric center of the corresponding one of the second metal conductors 32 (or the first metal conductors 31) are spaced apart from each other by a predetermined distance T2. Two geometric centers of two adjacent ones of the second metal conductors 32 (or the two adjacent first metal conductors 31) are spaced apart from each other by a spacing T1. When the spacing T1 has a minimum value, the two boundaries L1 of the two adjacent unit cells 3U overlap with each other, the unit cells 3U are arranged to be in close contact with each other, and the predetermined distance T2 is equal to half of the spacing T1. In the present disclosure, the antenna array formed by the four radiating elements 2 in the antenna module M is configured to generate an operating frequency about 60 GHz. Each predetermined distance T2 in each of the unit cells 3U is less than ⅙ of a wavelength of the operating frequency, and a boundary length T3 of each unit cell 3U is less than ⅓ of the wavelength of the operating frequency.

Figure 7:
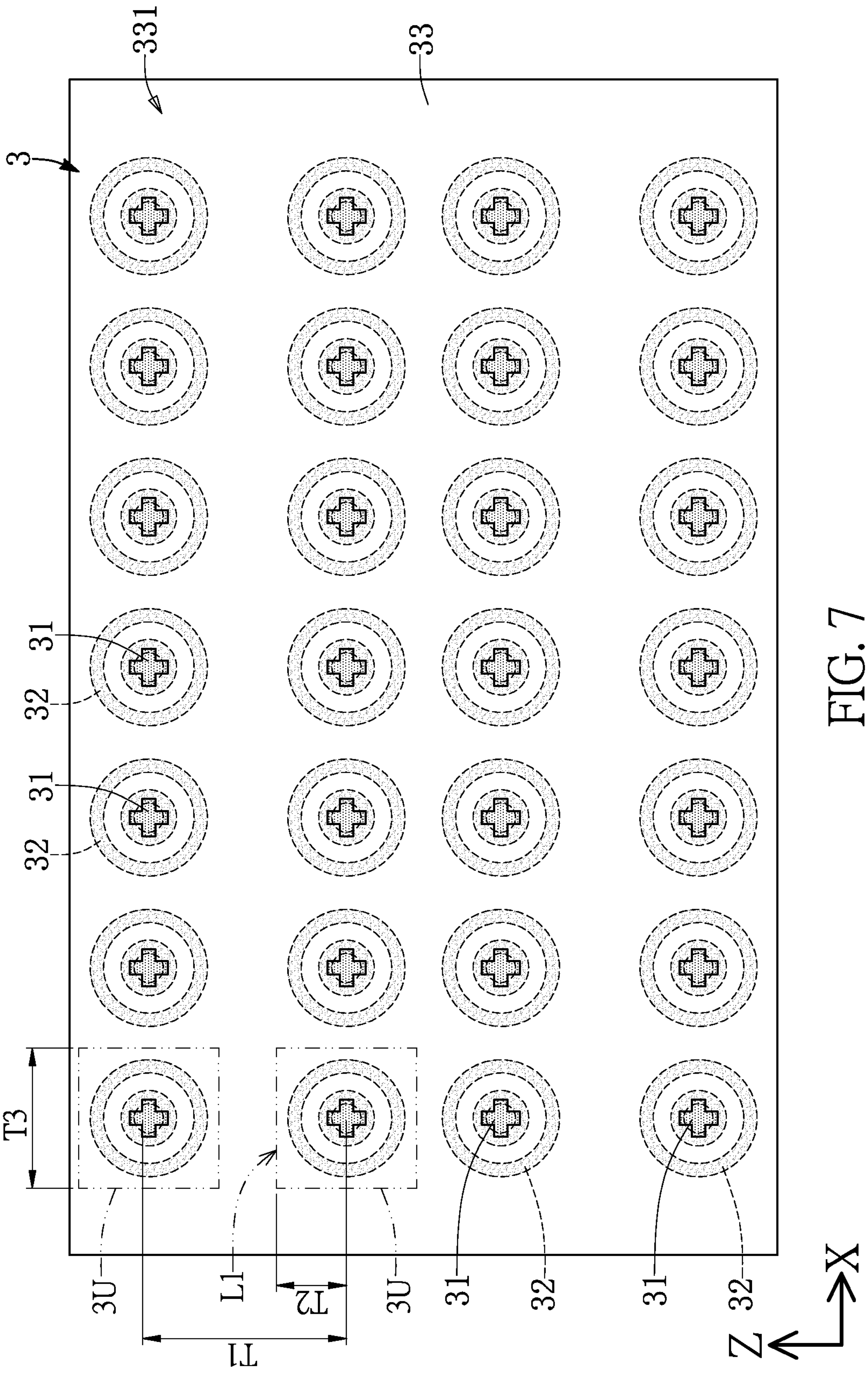
FIG. 7 is a schematic top view of the metamaterial structure according to the second embodiment of the present disclosure.

Referring to FIG. 7. FIG. 7 is a schematic top view of the metamaterial structure according to the second embodiment of the present disclosure. FIG. 6 and FIG. 7 respectively represent two different distribution configurations of the unit cells 3U. Specifically, as shown in FIG. 7, the two boundaries L1 of two adjacent unit cells 3U arranged along the Z-axis direction do not overlap with each other. Therefore, the predetermined distance T2 in FIG. 7 is less than ⅓ of the spacing T1.

For example, the antenna module M in the present disclosure can be applied to a gesture recognition radar, which is a mmWave radar with gesture recognition function. The antenna module M transmits a signal to a to-be-detected object (such as a human) through one of the radiating elements 2 serving as the transmitter in the antenna array, and the signal is reflected by the to-be-detected object and further received by the other three of the radiating elements 2. Then, the antenna module M is used to recognize gestures of the to-be-detected object. As shown in FIG. 4, the mmWave can emit into the antenna module M along a variety of directions. If an incident direction N of the mmWave parallel to the Y axis (i.e., perpendicular to the glass material layer S) is taken as an axis, the angle between another incident direction and the incident direction N is an elevation angle θ. By the different distribution configurations of the unit cells 3U of the metamaterial structure 3, the linearity of the phase difference in a range of the elevation angle θ=60° to −60° between the two radiating elements 2 used as the receivers in the antenna array can be improved, so as to accurately sense the gestures of the to-be-detected object.

Figure 9:
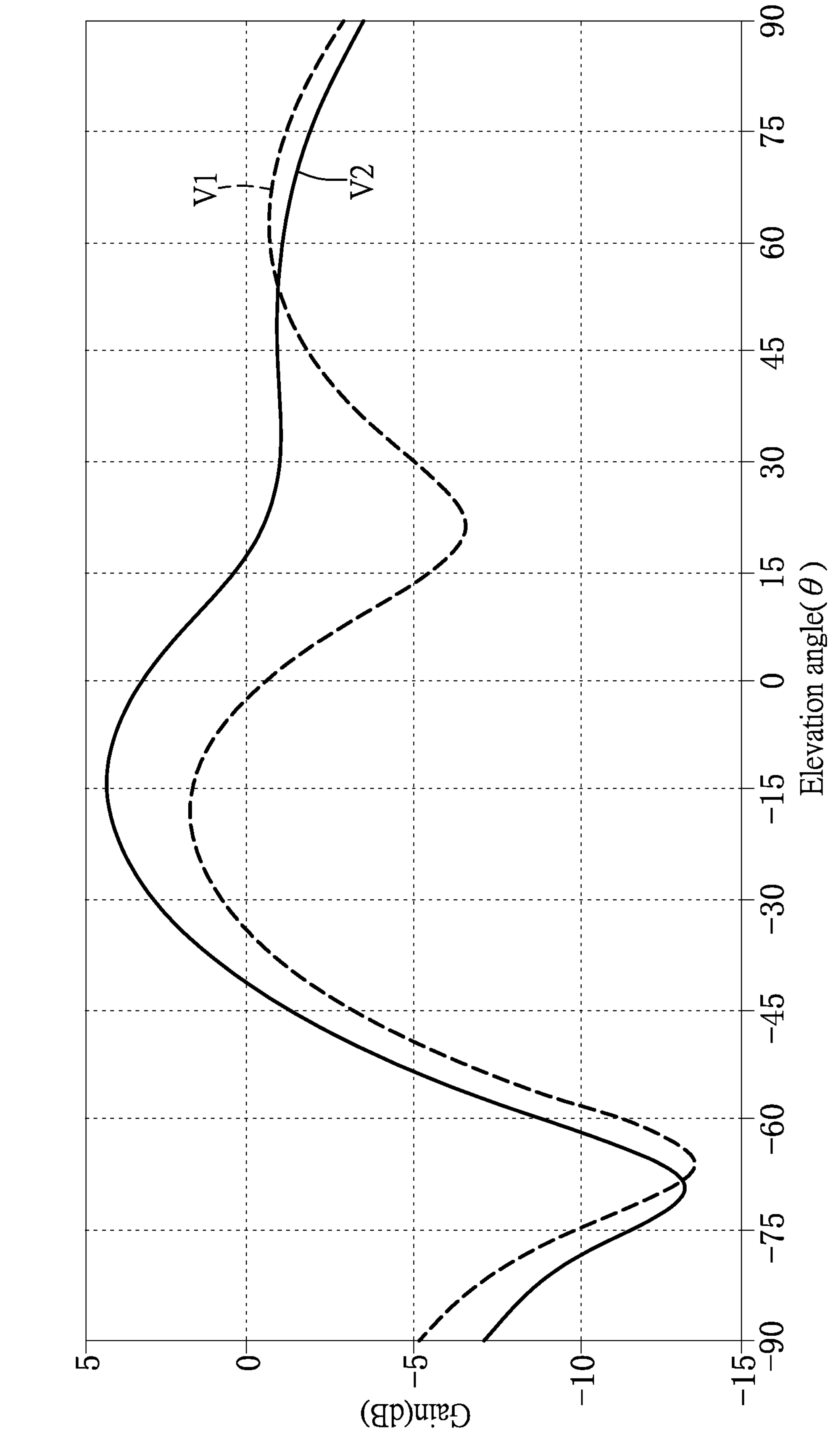
FIG. 9 is a curve diagram showing a gain of the antenna structure in different configurations according to the present disclosure.

Referring to FIG. 9. FIG. 9 is a curve diagram showing a gain of the antenna structure in different configurations according to the present disclosure. A line segment V1 represents an antenna module without the metamaterial structure 3 in the related art, and a line segment V2 represents the antenna module M with the metamaterial structure 3 in the present disclosure. As shown in FIG. 9, the antenna gain of the antenna module M in the present disclosure in the range of the elevation angle θ=60° to −60° is obviously better than the antenna gain of the antenna module in the related art. In other words, the antenna module M in the present disclosure can offset the effect of the glass material layer S on the radiation pattern of the antenna array.

Figure 10:
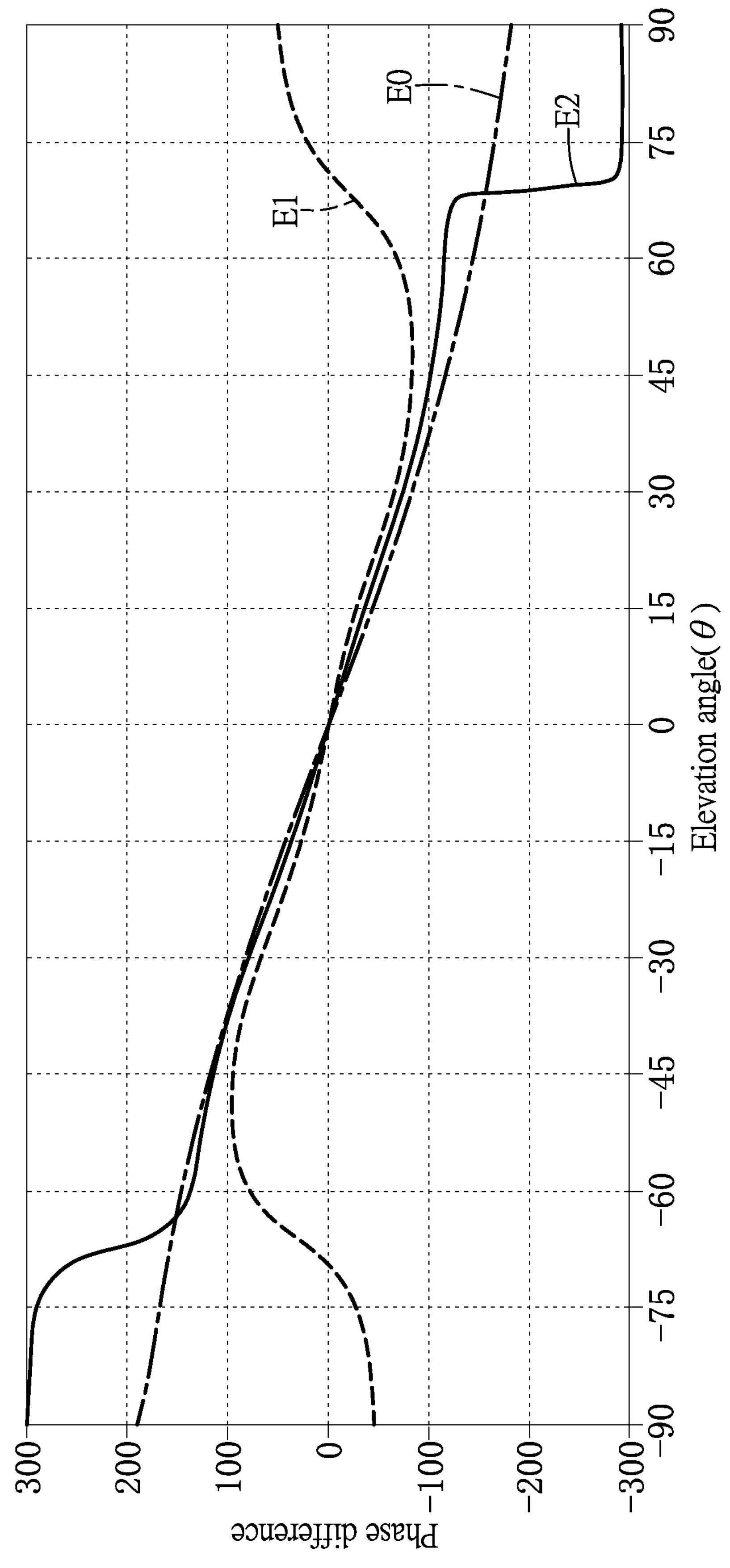
FIG. 10 is a curve diagram showing a phase difference of the antenna structure in different configurations according to the present disclosure.

Referring to FIG. 10. FIG. 10 is a curve diagram showing a phase difference of the antenna structure in different configurations according to the present disclosure. A line segment E0 represents the antenna module M without the glass material layer S. Line segments E1 and E2 represent the antenna module M with the glass material layer S. The line segment E1 further represents the distribution configuration of the unit cells 3U of the metamaterial structure 3 in the antenna module M of FIG. 6. The line segment E2 further represents the distribution configuration of the unit cells 3U of the metamaterial structure 3 in the antenna module M of FIG. 7. As shown in FIG. 10, the line segments E1 and E2 approach the line segment E0 in the range of the elevation angle θ=60° to −60°. Therefore, as shown in FIG. 6 or FIG. 7, the linearity of the phase difference of the antenna module M in the range of the elevation angle θ=60° to −60° can approach to that of the antenna module M without the glass material layer S by adjusting the distribution configuration of the unit cells 3U.

Beneficial Effects of the Embodiments

In conclusion, the antenna module M, the metamaterial structure 3 and the electronic device D provided by the present disclosure can perform the impedance matching on the glass material layer S through the structural design of the metamaterial structure 3 and the air gap G, thereby reducing a loss of the electromagnetic wave caused by the reflection or refraction of the electromagnetic wave penetrating the glass material layer S, and offset the effect of the glass material layer S on the radiation characteristic and the radiation pattern of the antenna array.

Moreover, the linearity of the phase difference in a range of the elevation angle θ=60° to −60° between the two radiating elements 2 used as the receivers in the antenna array can be improved by the different distribution configurations of the unit cells 3U of the metamaterial structure 3, so as to improve the accuracy of the gesture recognition function.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna module, comprising:

a substrate;

at least one radiating element disposed on the substrate; and a metamaterial structure disposed on the substrate, wherein the metamaterial structure and the at least one radiating element are located on a same side of the substrate, and the metamaterial structure includes:

a metamaterial substrate having a first surface and a second surface disposed opposite to each other, wherein the second surface faces the at least one radiating element; and a plurality of first metal conductors and a plurality of second metal conductors, wherein the first metal conductors are disposed on the first surface and spaced apart at intervals from each other, the second metal conductors are disposed on the second surface and spaced apart at intervals from each other, the first metal conductors respectively correspond to the second metal conductors, and shapes of the first metal conductors are different from shapes of the second metal conductors.

2. The antenna module according to claim 1, wherein the at least one radiating element directly contacts the second surface.

3. The antenna module according to claim 1, wherein the at least one radiating element and the second surface are spaced apart from each other by an air gap.

4. The antenna module according to claim 3, wherein the first surface and the second surface are spaced apart from each other by a predetermined thickness, and a width of the air gap is less than twice the predetermined thickness.

5. The antenna module according to claim 1, wherein each of the first metal conductors is formed to have a cross-shaped structure, and each of the second metal conductors is formed to have two ring structures that are concentric and not in contact with each other.

6. The antenna module according to claim 1, wherein each of the first metal conductors is formed to have a cross-shaped structure, and each of the second metal conductors is formed to have a square structure.

7. The antenna module according to claim 1, wherein each of the first metal conductors and a corresponding one of the second metal conductors are not in contact with each other, and an area of each of the first metal conductors is less than an area of a corresponding one of the second metal conductors.

8. The antenna module according to claim 1, wherein a projection point from a geometric center of each of the first metal conductors being orthogonally projected onto the second surface overlaps with a projection point from a geometric center of a corresponding one of the second metal conductors being orthogonally projected onto the second surface.

9. The antenna module according to claim 8, wherein the metamaterial structure includes a plurality of unit cells, each of the unit cells includes one of the first metal conductors and the corresponding one of the second metal conductors, a boundary of each of the unit cells and the geometric center of the corresponding one of the second metal conductors are spaced apart from each other by a predetermined distance, and two geometric centers of two adjacent ones of the second metal conductors are spaced apart from each other by a spacing; wherein, when the spacing has a minimum value, the two boundaries of the two adjacent unit cells overlap with each other, and the predetermined distance is equal to half of the spacing.

10. The antenna module according to claim 9, wherein the at least one radiating element is used for generating an operating frequency, the predetermined distance is less than ⅙ of a wavelength of the operating frequency, and a boundary length of each of the unit cells is less than ⅓ of the wavelength of the operating frequency.

11. A metamaterial structure being suitable for an antenna module, the antenna module being used for providing an operating frequency, the metamaterial structure comprising:

a metamaterial substrate having a first surface and a second surface disposed opposite to each other; and a plurality of first metal conductors and a plurality of second metal conductors, wherein the first metal conductors are disposed on the first surface and spaced apart at intervals from each other, the second metal conductors are disposed on the second surface and spaced apart at intervals from each other, the first metal conductors respectively correspond to the second metal conductors, and shapes of the first metal conductors are different from shapes of the second metal conductors.

12. The metamaterial structure according to claim 11, wherein each of the first metal conductors is formed to have a cross-shaped structure, and each of the second metal conductors is formed to have two ring structures that are concentric and not in contact with each other.

13. The metamaterial structure according to claim 11, wherein each of the first metal conductors and a corresponding one of the second metal conductors are spaced apart from each other, and an area of each of the first metal conductors is less than an area of a corresponding one of the second metal conductors.

14. The metamaterial structure according to claim 11, wherein the metamaterial structure includes a plurality of unit cells, each of the unit cells includes one of the first metal conductors and a corresponding one of the second metal conductors, a boundary of each of the unit cells and the geometric center of a corresponding one of the second metal conductors are spaced apart from each other by a predetermined distance, and two geometric centers of two adjacent ones of the second metal conductors are spaced apart from each other by a spacing; wherein, when the spacing has a minimum value, the two boundaries of the two adjacent unit cells overlap with each other, and the predetermined distance is equal to half of the spacing.

15. An electronic device, comprising:

a housing;

a glass material layer disposed at the housing; and an antenna module disposed in the housing, wherein the antenna module includes:

a substrate;

at least one radiating element disposed on the substrate; and a metamaterial structure disposed on the substrate, wherein the metamaterial structure and the at least one radiating element is located on a same side of the substrate, and the metamaterial structure includes a metamaterial substrate, a plurality of first metal conductors, and a plurality of second metal conductors, the metamaterial substrate has a first surface and a second surface disposed opposite to each other, the second surface faces the at least one radiating element, the first metal conductors are disposed on the first surface and spaced apart at intervals from each other, the first metal conductors contact the glass material layer, the second metal conductors are disposed on the second surface and spaced apart at intervals from each other, the first metal conductors respectively correspond to the second metal conductors, and shapes of the first metal conductors are different from shapes of the second metal conductors.

16. The electronic device according to claim 15, wherein the at least one radiating element and the second surface are spaced apart from each other by an air gap, the first surface and the second surface are spaced apart from each other by a predetermined thickness, and a width of the air gap is less than twice the predetermined thickness.

17. The electronic device according to claim 15, wherein each of the first metal conductors is formed to have a cross-shaped structure, and each of the second metal conductors is formed to have two ring structures that are concentric and not in contact with each other.

18. The electronic device according to claim 15, wherein each of the first metal conductors and a corresponding one of the second metal conductors are spaced apart from each other, and an area of each of the first metal conductors is less than an area of a corresponding one of the second metal conductors.

* * * * *